Dec. 16, 1969    R. SPURR ET AL    3,483,971
GLASSWARE INSPECTION MECHANISM
Filed Jan. 16, 1968    3 Sheets-Sheet 2

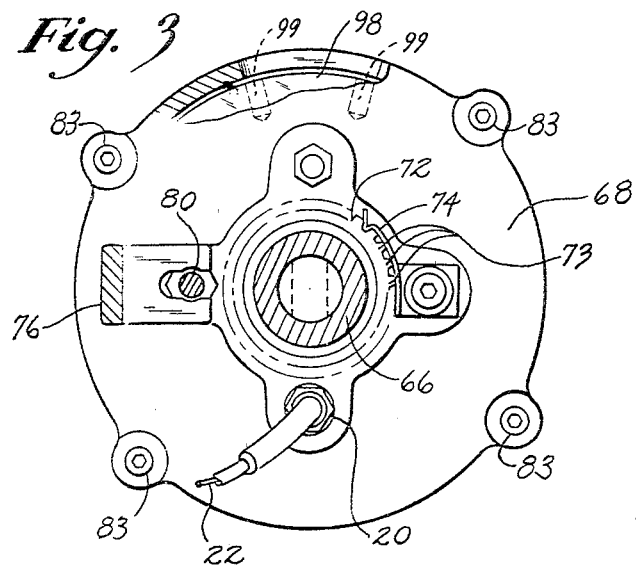
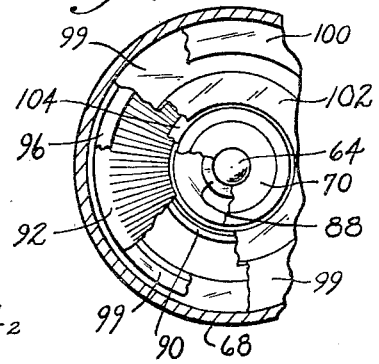
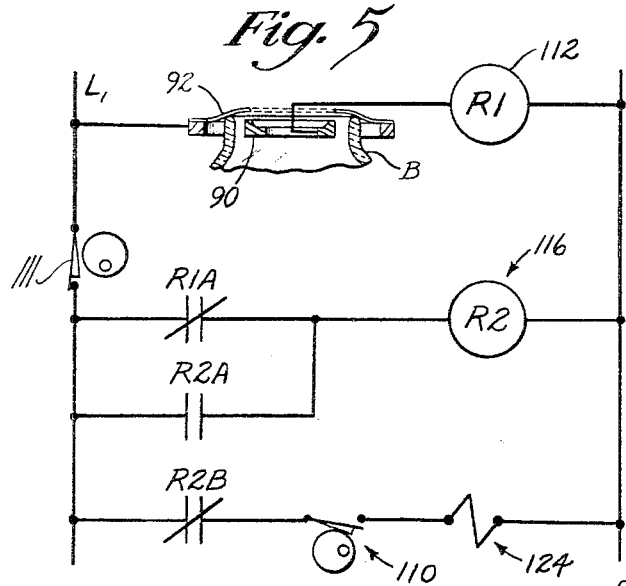
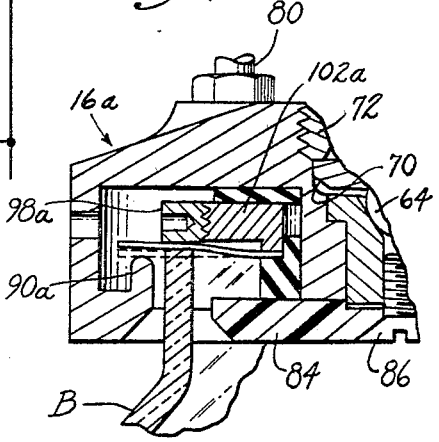

United States Patent Office 3,483,971
Patented Dec. 16, 1969

3,483,971
GLASSWARE INSPECTION MECHANISM
Robert Spurr, West Hartford, and Edward Boyd
Gardner, Bloomfield, Conn., assignors to Emhart
Corporation, Bloomfield, Conn., a corporation of
Connecticut
Filed Jan. 16, 1968, Ser. No. 698,252
Int. Cl. B07c 5/02; G01b 7/00; B23q 17/00
U.S. Cl. 209—80                                    10 Claims

ABSTRACT OF THE DISCLOSURE

A vertically reciprocable head assembly has an annular cavity in its lower face for receiving the finish, or neck portion, of a glassware article. A flat conductive disc is mounted in the head assembly, and defines a plurality of radially inwardly extending fingers, all of which are connected to source of electrical energy at their outer ends and have inner ends which normally engage a grounding member at the center of the lower portion of the head. As the head is lowered onto the ware finish, the inner ends of the fingers are deflected upwardly off the grounding member and against an annular stop which is adjustably located above the grounding member, and when any one finger fails to be so deflected by a glassware article being inspected, a reject signal is generated. The head is mounted for limited tilting movement, the degree of which tilt can be preset so that a slanted finish can be accepted if within certain limits. An alternative construction utilizes a disc having radially outwardly extending fingers for the inspection of larger diameter glassware neck portions.

Summary of invention

This invention relates to glassware inspection devices, and deals more particularly with a glassware inspection mechanism for checking the plane of the finish of the neck portion of a glassware article for detecting variations in the finish plane which would preclude proper sealing of the ware by a conventional closure.

A general object of the present invention is to provide a glassware inspection mechanism of the foregoing character for use at one station in a glassware inspection machine wherein the glassware is advanced between successive stations to carry out a comprehensive inspection program.

A more specific object of the present invention is to provide a glassware inspection mechanism capable of detecting dips and saddles in the glassware finish without rejecting ware having some predetermined degree of slant in the finish plane, and without rejecting ware having a finish not precisely concentric with the body portion of the ware.

Brief description of drawings

FIG. 3 is a horizontal sectional view taken along the line 3—3 of FIG. 1.

FIG. 3A is a fragmentary view of an apparatus of the type shown in FIG. 3, but of alternative construction with portions broken away to reveal a conductive disc having radially outwardly directed fingers for engaging the ware finish.

FIG. 4 is a fragmentary view of the apparatus shown in FIG. 3 with portions thereof broken away to reveal the conductive disc mounted therein with radially inwardly directed fingers for engaging the ware finish.

FIG. 5 is a schematic view of the electrical circuitry associated with a mechanism of the present invention.

Detailed description of the preferred embodiments

Figure 1:
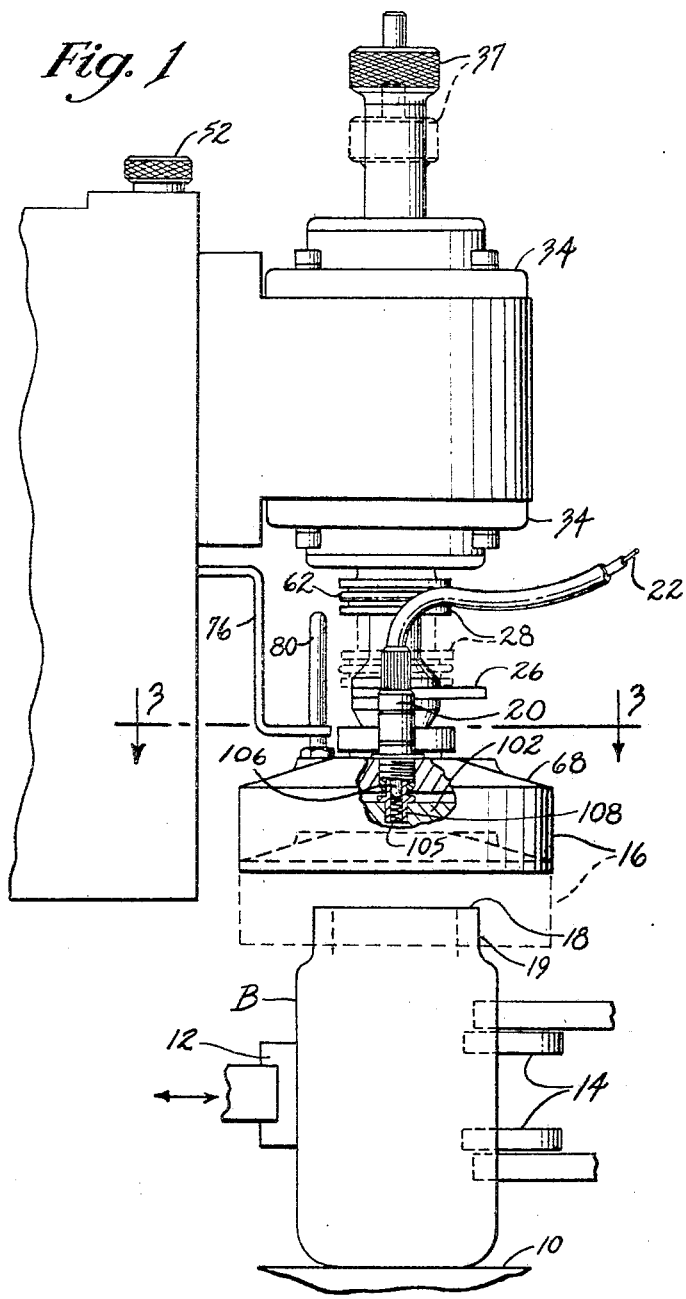
FIG. 1 is a vertical elevational view of a glassware inspection mechanism incorporating the present invention, with the head assembly thereof shown in full lines in its raised position and in broken lines in its lowered position.

Turning now to the drawings in greater detail, FIG. 1 shows a portion of a glassware inspection machine having a plurality of stations for detecting flaws in a glassware article as it is fed from station to station with predetermined dwell periods at each such station. Means (not shown) is provided for advancing the ware from scation to station on a deadplate, or reference surface 10, and for trapping the bottle B at each station, as for example by movement of a reciprocable pad 12 at the station shown, which pad traps the bottle B against rollers 14, 14. During certain types of inspection at other stations of the machine (not shown) the bottle may be rotated about its own axis, but at the inspection station shown the bottle is held without rotating while a head assembly 16 is lowered onto the neck portion of the bottle to detect flaws in the finish thereof indicated generally at 18. The head assembly 16 is provided with electrical energy through a probe 20 having a contact element 106 connected to a conductive disc 102 in the head assembly through an annular socket defining post 108 carried by the disc 102. A spring 105 also connects the disc 102 to the element 106.

The head assembly 16 is swivelly mounted at the lower end of a spindle 24 and more particularly on a rocker sleeve 66 carried on the spindle 24 by a U-shaped clip 26. The spindle 24 is normally biased to the position shown inside an outer spindle 28 by a compression spring 30 acting between an upwardly facing shoulder on the inner spindle 24 and a downwardly facing shoulder 32 defined on an annular bushing 33 fixed in the outer spindle 28 of the upper end portion. The outer spindle 28 is slidably mounted for vertical motion between top and bottom housing parts 34, 34 each of which carry bushings indicated generally at 36, 36 respectively. An adjusting nut 37 permits the relative positions of the spindles 24 and 28 to be preset with respect to one another. The outer spindle 28 has a piston 38 secured thereto by a nut 39, which piston is adapted to travel upwardly or downwardly in response to air under pressure from the valves 40 and 42 respectively. A cylindrical housing 44 is mounted between the upper and lower housing parts 34, 34 for slidably receiving the piston 38. A housing 46 containing the valves 40 and 42 controls the supply of air 48 to direct the same to one on the other sides of the piston 38 and to exhaust air from the opposite side in order to sequentially extend and retract the outer spindle 28 in timed operation with the mechanism provided at other stations in a glassware inspection machine of the type described above. A pilot air line 50 is provided to the housing 46 and it is noted that the valves comprise a conventional component for operating a piston sequentially in opposite directions in response to variations in the pressure of the pilot line 50. A control knob 52 serves to adjust the height of the housing 44 with respect to the reference surface 10 for accommodating glass bottles of various heights.

Turning now to a more detailed description of the spindles 24 and 28, it will be apparent that the inner spindle 24 will move through only a portion of the travel of the outer spindle 28 when a glassware article B is engaged by a head 16 in response to lowering of the piston 38 from the position shown in full lines to the broken line position shown in FIG. 1. More particularly, the compression spring 30 will be compressed once the head 16 engages the glassware article B to make up for this difference in travel. It is an important feature of the present invention that the head 16 can be used with glassware articles which may not have their neck portions 19 arranged in precisely concentric relation with the body portion of the bottle B. In this connection, annular guiding surfaces 54 and 56, defined in the lower portion of the head 16, served to guide the head during downward movement thereof so as to position the finish of the bottle, indicated generally at 18, against the contact disc fingers mounted for this purpose within the head and to be described in greater detail hereinbelow. In the event that the annular neck portion 19 and the cylindrical body portion of a bottle B are not precisely concentric with respect to one another due to some imperfection in forming of the glassware, the inner spindle 24 will move slightly from its vertical orientation, flexing slightly at the necked-down portion, indicated generally at 58, so as to permit the head 16 to search for the annular finish 18. In order to permit this searching motion of the inner spindle 24 with respect to the outer spindle 28 three circumaxially spaced balls 60, 60 are provided adjacent the lower end portion of the inner spindle 24 in sockets provided for this purpose in the lower end portion of the outer spindle 28. Preferably, and as shown, these sockets comprise radially extending openings, and the balls 60, 60 are retained therein by an O-ring 62. As so constructed and arranged, the inner spindle 24 is free to move with respect to the outer spindle 28 within predetermined limits so as to permit the head 16 to search for annular finish 18 of the bottle B, and more particularly to assure that the finish engages the contact disc provided for this purpose in the head 16.

In further accordance with the present invention, means is provided for mounting the head assembly 16 on the lower end of the inner spindle 24 for limited tilting movement with respect to said spindle 24 in order to allow the inspection of glassware having a finish 18 which may be other than horizontal, that is the finish plane may be slanted with respect to the vertical center line of the outer spindle 28 rather than perpendicular thereto. It will be apparent that a bottle having some slight slant in its finish may be acceptable, in that a closure may be mated with the finish if the finish is not otherwise defective. In the embodiment shown the means provided comprises a steel ball 64 between the head assembly 16 and a rocker sleeve 66, which sleeve is carried at the lower end of the inner spindle 24 by the U-shaped clip 26 mentioned hereinabove.

Figure 2:
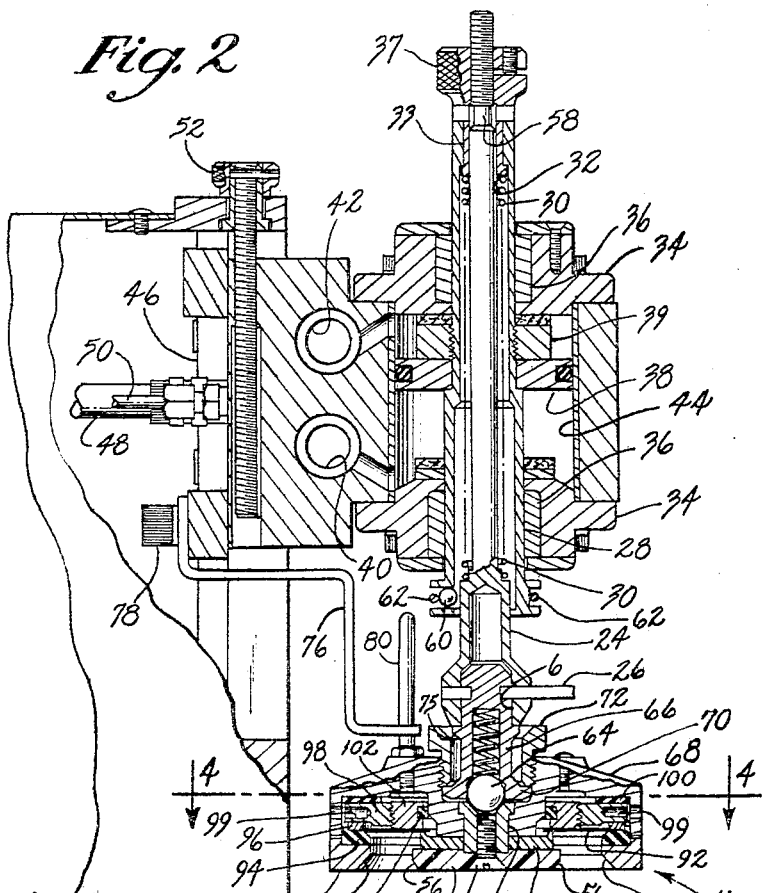
FIG. 2 is a vertical sectional view of the mechanism shown in FIG. 1.

The head assembly 16 includes an upper housing part, or portion 68 which defines an upwardly open cylindrical receptacle for receiving the rocker sleeve 66, and more particularly for receiving a radially outwardly extending annular flange portion thereof, indicated generally at 70. Means is provided for adjusting the degree of articulation of the upper housing part 68 with respect to the rocker sleeve 66, and as shown in FIG. 2 said means comprises an annular screw 72 threadably received in the cylindrical opening in the housing 68. The lower end of the screw 72 engages the radially outwardly extending flange 70 on the rocker sleeve 66 provided for this purpose. The screw 72 also has a plurality of teeth defined in the upper external collar portion thereof, as best shown in FIG. 3 at 73, 73, and a ratchet spring 74 serves to releasably retain the screw 72 in a preset position by engaging one of said teeth 73 so that the device can accommodate glass bottles of predetermined slant. When the slant of the finish plane 18 exceeds a predetermined value the internal upper end portion of the screw 72 engages a shoulder 75 provided the vertical center line of the inner spindle 24. A torsion for this purpose on the rocker sleeve 66, preventing further tilting movement of the head assembly 16 with respect to bracket 76 has one end mounted in the fixed frame of the machine, as by the screw 78, and an opposite end which loosely receives an upstanding guide post 80, provided for this purpose in the upper housing part 68.

Turning now to a more detailed description of the head assembly 16, the upper housing part 68 is connected to a lower annular housing part 82 by a plurality of screws 83, 83 shown in FIG. 3. The housing parts 68 and 82 cooperate to define an annularly shaped cavity in which various components are mounted. More particularly, the annular guide surface 54, referred to hereinabove, is defined on the lower housing part 82 while the inner annular guide surface 56 is defined on a disc 84 secured in fixed relation to the housing part 82 by a screw 86 threadably received in the housing part 68. An annular seat 88 is mounted in fixed relation in the upper housing part 68 and defines a threaded opening for receiving the screw 86. Thus, the disc 84 can be conveniently removed and replaced with a differently sized disc to provide a plug gauge for inspecting glassware having neck portions of various sizes.

The screw 86 also serves to hold in place a first conductive means, in the form of an annular lower contact ring 90, having a raised peripheral edge for contacting the inner radial ends of a plurality of fingers, best shown in FIG. 4, defined on a conductive disc element 92. The conductive disc element 92 is clamped, adjacent its outer peripheral edge, between a phenolic insulating spacer 94 and an aluminum spacer 96. The aluminum spacer 96 is insulated from the housing portion 68 of the head assembly by a peripheral flange on the phenolic spacer 94.

Figure 6:
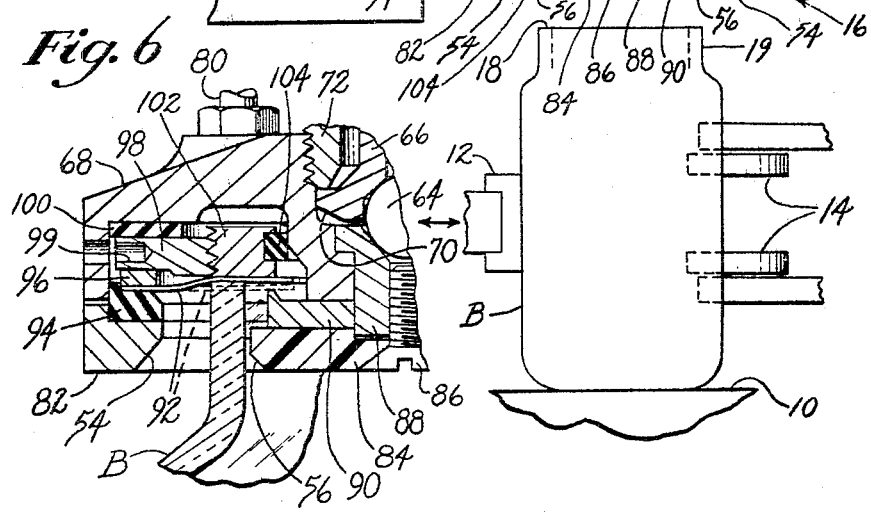
FIG. 6 is a detail view of a portion of the ware finish showing its relation to the conductive disc during inspection.

In still further accordance with the present invention circuit means is provided for normally energizing the outer peripheral portion of the conductive disc element 92. Preferably, said circuit means includes an annular nut 98 rotatably mounted between the aluminum spacer 96 and a phenolic spacer 100. Means is provided for connecting the conductive element 22 in the probe 20 to the annular nut 98 for this purpose. As shown in FIGS. 2 and 6 the annular nut 98 threadably receives an annular screw member 102 mounted in insulated relation to the housing part 68 on a centering ring 104 of insulating material. As best shown in FIG. 1, the probe 20 includes a contact or pin 106 which is received in a socket defining post 108 carried by the member 102. Thus, in the condition shown in FIG. 2 electrical energy is available, by means of the probe 20 through the member 102 and the nut 98 and the aluminum washer 96, to the outer periphery of the conductive disc element 92.

Radially inwardly extending fingers defined by the conductive disc element 92, and best shown in FIG. 4, engage the raised peripheral edge on the contact ring 90 to complete a circuit to the grounded housing 68. The raised peripheral edge of the contact ring 90 is preferably so arranged that the fingers are biased slightly upwardly in their broken line or normal positions shown in FIG. 6. When the head 16 is lowered onto a bottle B for inspection, as depicted in FIG. 6, the annular finish 18 of the bottle engages portions of the fingers intermediate the inner and the outer radial ends thereof causing the fingers to flex upwardly against the underside of the member 102. The force supplied by the spring 30 is preferably slightly greater than the biasing force of the flexed fingers. If in fact all of the fingers are so raised by the finish 18 on a bottle B the bottle will have passed the inspection through a circuit to be discussed hereinbelow. On the other hand, if one or more of these fingers should not be raised off the peripheral edge of the contact member 90 as a result of a dip or saddle in the finish, the above-mentioned circuit will cause that bottle to be rejected in response to a reject signal from the circuit to be described. Thus, the member 102 comprises an adjustable stop means mounted above the intermediate portions of the fingers for limiting the upward deflection thereof during inspection. It is an important feature of the present invention that the stop member 102 can be adjusted with respect to the normal position of the fingers as said fingers are raised from the broken line position shown in FIG. 6. Thus the underside of the stop member 102 always remains parallel to the raised peripheral edge of the contact ring 90.

More particularly, the stop member 102 is threadably received in the annular nut 98, and therefore can be moved axially in response to rotation of the nut 98, by inserting a pin or other tool in the opening 99 provided for this purpose and rotating the nut 98 in either a clockwise or counterclockwise direction. Thus, the tolerance of the particular dip or saddle defect in the finish portion 18 of the bottle B can be preset manually just as can the degree of tilt acceptable in the finish plane upon rotation of the annular screw 72 mentioned previously.

Turning now to a description of the schematic representation of the electrical circuitry associated with an inspection mechanism of the type described, FIGURE 5 shows, in schematic fashion a normally closed switch having finger contacts 92 for normally energizing the relay R1, indicated at 112. Thus, whenever the bottle being inspected fails to lift even one finger 92, normally closed contacts R1A associated with relay R1 are opened and relay R2, indicated generally at 116, cannot be energized. The normally closed contacts R2B associated with relay R2 will then be closed, and when an interrogate switch 110 closes by the cam shown, reject solenoid 124 will be energized. Thus, by use of the cam operated switch 110, a reject signal can be generated at a particular point in the time during the cyclical operation of the glassware advancing mechanism, a portion of which is indicated generally at 12 in FIG. 1. A reset switch 111 is opened by another cam at a slightly later instant of time during the same cycle of operation of the machine, and it will be apparent that the switch 111 thereby serves to reset relay R2 for the next cycle of operation. Relay R1 will have been reset by the contact disc fingers 92 since the actual period of engagement between the switch 92 and a bottle being inspected is quite short.

On the other hand, if the bottle at the inspection station does raise all the fingers 92 off the contact ring 90, relay R1 (112) will be de-energized and its contacts R1A will energize relay R2 (116). Contacts R2B thus open precluding the energizing of reject solenoid 124. As a result of the short time period during which the actual inspection takes place, holding contacts R2A associated with relay R2 are required to maintain R2 in an energized condition until reset by the switch 111.

Thus, the circuit shown provides a convenient one for generating a reject signal having a duration which is determined by the closing and opening of the limit switches 110 and 111 respectively. By means of the relay R2 the rather short time interval during which the finger switch 92 is opened, because of an acceptable bottle, does not effect the time interval during which the reject signal is retained in the circuit. Thus, the limit switch 111 controls the duration of the pulse for operating the reject solenoid 124. It will be apparent to those skilled in the glassware inspection art that the reject solenoid could also be made to operate during a subsequent cycle of operation, as if several inspection stations are provided in a machine and the final station comprises a reject station.

FIGURE 3A shows an alternative construction for a head assembly 16a to be used in an inspection mechanism of the type described above. An annular housing is supported in articulated fashion as in the previously described embodiment. An annular nut 98a is threadably supported on an annular screw member 102a and the latter is connected electrically to a probe 20 (not shown) of the type described above to provide circuit means for feeding current to the inner ends of a plurality of radially outwardly extending fingers comprising the disc 92a. These fingers are integrally connected to one another at their inner radial ends and are separated from one another at their outer radial ends. The outer ends normally engage a raised peripheral edge 90a of the housing in the same manner, and with the same slight biasing force with which the inner ends of the fingers of the disc 92 engage the raised peripheral edge of the ring 90 in the previous embodiment.

Thus, when the head 16a is lowered onto the finish portion of a bottle B, as depicted in FIG. 3A, intermediate portions of these fingers flex upwardly until they are stopped by the underside of the member 102a. If in fact all of the fingers are so raised by the finish of the bottle B, the bottle will have passed inspection through a circuit such as that described hereinabove with reference to the preceding embodiment.

The invention claimed is:

1. Glassware inspection mechanism for producing an electrical signal when a defective article of glassware is detected, said mechanism comprising a head assembly mounted above an article to be inspected for movement toward and away therefrom, a flat conductive element in said head assembly and having a plurality of generally radially extending fingers each of which is electrically connected to adjacent fingers of said element at one of its respective ends, means for normally connecting said conductive element to a source of electrical energy adjacent the interconnected ends of said fingers, free ends of said fingers opposite said interconnected ends thereof, said element being so arranged in said head assembly that a portion of each of said fingers intermediate said free and interconnected ends is engaged by the finish of a glassware article being inspected, first conductive means in said head assembly for completing an electric circuit between the free ends of all of said fingers and said electrical energy source when no article is in engagement with said element for inspection, and adjustable stop means above said intermediate portions of said fingers for limiting the upward deflection thereof during inspection.

2. The combination defined in claim 1 further characterized by means for mounting said head assembly for tilting movement with respect to a flat plane defined by an ideal article finish, and means for limiting the degree of tilt of said head assembly and hence of said contact element when an article is being inspected.

3. The combination defined in claim 1 wherein said flat conductive element comprises a disc having a central opening and radially inwardly extending fingers integrally connected to one another at their outer radial ends and separated from one another at their inner radial opening defining ends, said first conductive means comprising a lower contact ring supported in said head assembly for normally closing said electric circuit by engagement with inner end portions of said fingers.

4. The combination defined in claim 3 wherein said means for connecting said element to an electric source comprises a probe connected to a source of electric energy and mounted in said housing, a contact in said probe for energizing said disc, an annular nut rotatably supported in said head assembly, said stop means comprising a member threadably received in said nut for limited axial movement in said head assembly in response to rotation of said nut.

5. The combination defined in claim 4 wherein said nut and said stop member are made of a conductive material, said probe including a spring for holding said contact in engagement with said stop member and said nut being electrically connected to the periphery of said finger defining contact disc.

6. The combination defined in claim 5 wherein said probe contact also serves to prevent relative rotation between said stop member and said head assembly, and ratchet means carried by said nut for precluding inadvertent rotation thereof with respect to said stop member while permitting forcible movement thereof to adjust the clearance between said stop member and said lower contact ring.

7. The combination defined in claim 6 and further characterized by an axially reciprocable spindle carrying said head assembly at its lower end, means for loosely supporting said spindle at least at its lower end so that said head assembly can be moved laterally as it descends onto an article to be inspected, and annular guiding surfaces on said head assembly for assuring that the finish portion of the article engages said intermediate portions of said fingers.

8. The combination defined in claim 1 wherein said flat conductive element comprises a disc having radially outwardly extending fingers integrally connected to one another at their inner radial ends and separated from one another at their outer radial ends, said first conductive means comprising a lower annular contact surface for normally closing said electric circuit by engagement with outer end portions of said fingers.

9. The combination defined in claim 1 further characterized by electrical means for inverting a current signal created upon completing said circuit, said electrical means serving to trigger a reject signal in response to the failure of a glassware article finish to generate an open circuit pulse in said current signal and a reject mechanism responsive to said reject signal.

10. The combination defined in claim 9 wherein said electrical means further includes delay means for holding even a momentary open circuit pulse long enough so that no reject signal can be generated as a result of failure of said reject mechanism to sense such a momentary condition.

References Cited

UNITED STATES PATENTS

| 3,106,780 | 10/1963 | Uhlig | 209—88 X |
| 3,371,421 | 3/1968 | Fink | 33—174 |

M. HENSON WOOD, JR., Primary Examiner

RICHARD A. SCHACHER, Assistant Examiner

U.S. Cl. X.R.

33—174; 209—88

PO-1050
(5/69)

UNITED STATES PATENT OFFICE
CERTIFICATE OF CORRECTION

Patent No. 3,483,971                    Dated December 16, 1969

Inventor(s) Robert Spurr and Edward Boyd Gardner

It is certified that error appears in the above-identified patent and that said Letters Patent are hereby corrected as shown below:

Col. 2, line 14, "soation" should be --station--.

Col. 3, lines 68 - 72;

Reads: "portion of the screw 72 engages a shoulder 75 provided/the vertical center line of the inner spindle 24. A torsion for this purpose on the rocker sleeve 66, preventing further tilting movement of the head assembly 16 with respect to bracket 76 has one end mounted in the fixed frame of the"

Should read:
--portion of the screw 72 engages a shoulder 75 provided/for this purpose on the rocker sleeve 66, preventing further tilting movement of the head assembly 16 with respect to the vertical center line of the inner spindle 24. A torsion bracket 76 has one end mounted in the fixed frame of the--.

SIGNED AND
SEALED
JUN 16 1970

(SEAL)
Attest:

Edward M. Fletcher, Jr.
Attesting Officer

WILLIAM E. SCHUYLER, J
Commissioner of Patent